(12) United States Patent
Nogawa

(10) Patent No.: US 8,223,950 B2
(45) Date of Patent: Jul. 17, 2012

(54) DUAL NETWORK TELEPHONE DEVICE

(75) Inventor: Hideki Nogawa, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 598 days.

(21) Appl. No.: 12/413,469

(22) Filed: Mar. 27, 2009

(65) Prior Publication Data

US 2009/0296917 A1 Dec. 3, 2009

(30) Foreign Application Priority Data

May 29, 2008 (JP) ................................. 2008-141359

(51) Int. Cl.
H04M 7/00 (2006.01)

(52) U.S. Cl. .................................. 379/219; 379/220.01

(58) Field of Classification Search .................. 379/219, 379/220.01, 230, 265.01, 265.09; 455/462, 455/557, 445

See application file for complete search history.

(56) References Cited

U.S. PATENT DOCUMENTS

| | | | |
|---|---|---|---|
| 6,728,546 B1 * | 4/2004 | Peterson et al. | 455/462 |
| 6,931,249 B2 * | 8/2005 | Fors et al. | 455/436 |
| 7,058,171 B2 | 6/2006 | Ouchi et al. | |
| 7,417,980 B2 | 8/2008 | Kato | |
| 2003/0013411 A1 * | 1/2003 | Uchiyama | 455/40 |
| 2003/0235186 A1 | 12/2003 | Park | |
| 2005/0190403 A1 | 9/2005 | Nakamura | |
| 2007/0123251 A1 * | 5/2007 | McElvaney | 455/426.1 |
| 2007/0167157 A1 | 7/2007 | Hundal | |
| 2007/0286174 A1 * | 12/2007 | Brannan et al. | 370/356 |
| 2008/0261603 A1 * | 10/2008 | Sever et al. | 455/445 |

FOREIGN PATENT DOCUMENTS

| | | |
|---|---|---|
| CN | 1426220 A | 6/2003 |
| EP | 0999683 A2 | 5/2000 |
| EP | 1376996 A2 | 1/2004 |
| EP | 1710988 A2 | 10/2006 |
| JP | 2001-024813 A | 1/2001 |
| JP | 2003-284158 A | 10/2003 |
| JP | 2004-180264 A | 6/2004 |
| JP | 2005-244794 A | 9/2005 |

(Continued)

OTHER PUBLICATIONS

The State Intellectual Property Office of the People's Republic of China, Notification of First Office Action for Chinese Patent Application No. 200910127916.2 (counterpart to above-captioned patent application), issued Mar. 24, 2011.

(Continued)

Primary Examiner — William Deane, Jr.
(74) Attorney, Agent, or Firm — Baker Botts L.L.P.

(57) ABSTRACT

A dual network telephone device selectively performs a telephone communication via a public telephone network and via an IP telephone network. The dual network telephone device generates IP telephone identification information for a non-IP telephone device registers to an IP telephone server an association of an IP address of the dual network telephone device and the IP telephone identification information for the non-IP telephone device, receives a first call request sent from the IP telephone server, sends a call request notice instruction to the non-IP telephone device when the first call request includes the IP telephone identification information for the non-IP telephone device as a call request destination, receives IP telephone identification information input to and sent from the non-IP telephone device, sends a second call request to the IP telephone server.

5 Claims, 11 Drawing Sheets

Telephone Network System 2

FOREIGN PATENT DOCUMENTS

WO 03073714 A1 9/2003

OTHER PUBLICATIONS

Japan Patent Office; Notification of Reasons for Rejection in Japanese Patent Application No. 2008-141359 (counterpart to the above-captioned US Patent Application) mailed on Jun. 29, 2010.

European Telecommunications Standards Institute, "Digital Enhanced Cordless Telecommunications (DECT); DECT access to IP networks," ETSI TS 102 265, Oct. 1, 2004, V1.2.1.

European Patent Office, European Search Report in counterpart Patent Application No. EP 09250948, mailed Jul. 27, 2009.

\* cited by examiner

Handset Device Information Storage Area 31

| Handset Device ID | SIP URI |
|---|---|
| XXX | bbb.aaa@example.com |
| YYY | ccc.aaa@example.com |
| ZZZ | |
| | |

210 — Handset Device ID column
212 — SIP URI column
200 → XXX row
202 → YYY row
204 → ZZZ row

FIG. 11

Handset Device Information Storage Area 31

| Handset Device ID | SIP URI | Port Number |
|---|---|---|
| XXX | bbb.aaa@example.com | sssss |
| YYY | ccc.aaa@example.com | ttttt |
| ZZZ | | |

230 →
232 →
234 →

210, 212, 214

DUAL NETWORK TELEPHONE DEVICE

CROSS-REFERENCE TO RELATED APPLICATION

This application claims priority to Japanese Patent Application No. 2008-141359, filed on May 29, 2008, the contents of which are hereby incorporated by reference into the present application.

BACKGROUND OF THE INVENTION

1. Field of the Invention

The present invention relates to a dual network telephone device that is able to selectively perform telephone communication via a public telephone network and via an IP telephone network.

2. Description of the Related Art

EP0999683A2 discloses a telephone device (a facsimile device) that is configured to perform telephone communication via a public telephone network. This telephone device is configured from a base device and a plurality of handset devices. Further, International Publication No. WO 03/073714 discloses an IP telephone device that is configured to perform telephone communication via an IP telephone network. Furthermore, in order to perform telephone communication using the IP telephone device, it is necessary to register an IP address and IP telephone identification information (for example, a SIP URI) of this IP telephone device to an IP telephone server.

Software for carrying out IP telephone communication is required to perform a telephone communication via the IP telephone network. For example, in a case where a telephone device is configured from a base device with which one or more handset devices can be utilized together, since both the base device and handset devices function as IP telephone devices, it is conceivable that the above software is installed in both the base device and the handset devices. However, employing this configuration requires storage areas for storing the above software in both the base device and the handset devices, thereby increasing manufacturing costs.

BRIEF SUMMARY OF THE INVENTION

This specification provides technology that makes it possible for a non-IP telephone device, which has not been installed with the software for carrying out IP telephone communication, to perform a telephone communication via the IP telephone network.

This specification discloses a dual network telephone device that may be configured to selectively perform a telephone communication via a public telephone network and via an IP telephone network. An example of the public telephone network may include the PSTN (Public Switched Telephone Network) or ISDN (Integrated Services Digital Network). Further, the IP telephone network is a concept comprising all sorts of communication networks that enable telephone communications using the Internet protocol (Voice over Internet Protocol). The above dual network telephone device may comprise an IP telephone identification information generating device, a registering device, a call request receiving device, a notice instruction sending device, an IP telephone identification information receiving device, a call request sending device, a response receiving device, and a voice data transferring device. The specific configuration of each of these devices will be explained hereinbelow.

The IP telephone identification information generating device may be configured to generate IP telephone identification information for a non-IP telephone device (may also be called an ordinary telephone device) that is configured to perform a telephone communication via the public telephone network using this dual network telephone device. Furthermore, the dual network telephone device and the non-IP telephone device may or may not relate to one another as in the relationship of the so-called base device and handset device. Further, the procedure by which the IP telephone identification information generating device generates IP telephone identification information is not particularly limited. For example, the IP telephone identification information generating device may randomly extract a plurality of characters (letters of the alphabet and/or numbers and/or predetermined symbols) to generate IP telephone identification information that includes these character strings. Further, for example, the IP telephone identification information generating device may be configured to generate IP telephone identification information for the non-IP telephone device by associating the IP telephone identification information that has been set in the dual network telephone device itself with other characters. The registering device may be configured to register to an IP telephone server an association of an IP address of the dual network telephone device and the IP telephone identification information for the non-IP telephone device generated by the IP telephone identification information generating device. Consequently, the non-IP telephone device is thereby registered to the IP telephone server.

The call request receiving device may be configured to receive a first call request sent from the IP telephone server. The notice instruction sending device may be configured to send a call request notice instruction to the non-IP telephone device on a condition that the first call request received by the call request receiving device includes the IP telephone identification information for the non-IP telephone device as a call request destination. As a result of this, a call request notice may thereby be executed at the non-IP telephone device. Furthermore, it should be noted that the terminology "call request notice" shall be interpreted in its broadest sense, and is a concept comprising a variety of possible techniques for notifying a user that a call request has been received. For example, outputting a sound (ringing), vibrating, displaying a prescribed message, or changing the lighting pattern of a lamp may be referred to as examples of the "call request notice". Upon recognizing the call request notice, the user of the non-IP telephone device knows that a call request has been received, and may perform a call start operation (an operation for starting a call; for example, a hook key operation) at the non-IP telephone device. The voice data transferring device may be configured to transfer to the non-IP telephone device voice data, which is sent from the call request source of the first call request or from the call request destination of the second call request, to the non-IP telephone device, and to transfer voice data sent from the non-IP telephone device to the call request source of the first call request or to the call request destination of the second call request on a condition that a call start operation is operated at the non-IP telephone device in response to the call request notice instruction sent by the notice instruction sending device. Furthermore, the above expression "on a condition that . . . " as herein used does not exclude other conditions (an AND condition and/or an OR condition) from being added to the aforementioned condition. The same holds true when the expression "on a condition that" is used hereinbelow as well.

The user of the non-IP telephone device is able to input the IP telephone identification information of the party he wishes to call into the non-IP telephone device. The IP telephone identification information receiving device may receive the IP telephone identification information input to and sent from the non-IP telephone device. The call request sending device may send to the IP telephone server a call request, which includes the IP telephone identification information received by the IP telephone identification information receiving device as the call request destination, and which also includes the IP telephone identification information for the non-IP telephone device as the call request source. The response receiving device may receive a response in reply to the call request sent by the call request sending device. The type of response received will depend on the action taken at the call request destination. For example, in a case where the call start operation has been performed at the call request destination, the response receiving device receives a positive response. Further, for example, in a case where the call request destination is busy and is unable to respond to the call request, the response receiving device receives a negative response. The voice data transferring device may be configured to transfer voice data, which is sent from a call request source of the first call request or from the call request destination of the second call request, to the non-IP telephone device, and to transfer voice data sent from the non-IP telephone device to the call request source of the first call request or to the call request destination of the second call request on a condition that the response received by the response receiving device is a positive response.

In a case where the above dual network telephone device is utilized, it becomes possible for a non-IP telephone device to perform a telephone communication via the IP telephone network.

BRIEF DESCRIPTION OF THE DRAWINGS

FIG. 11 shows an example of the contents stored in the handset device information storage area of a second embodiment.

Figure 1:
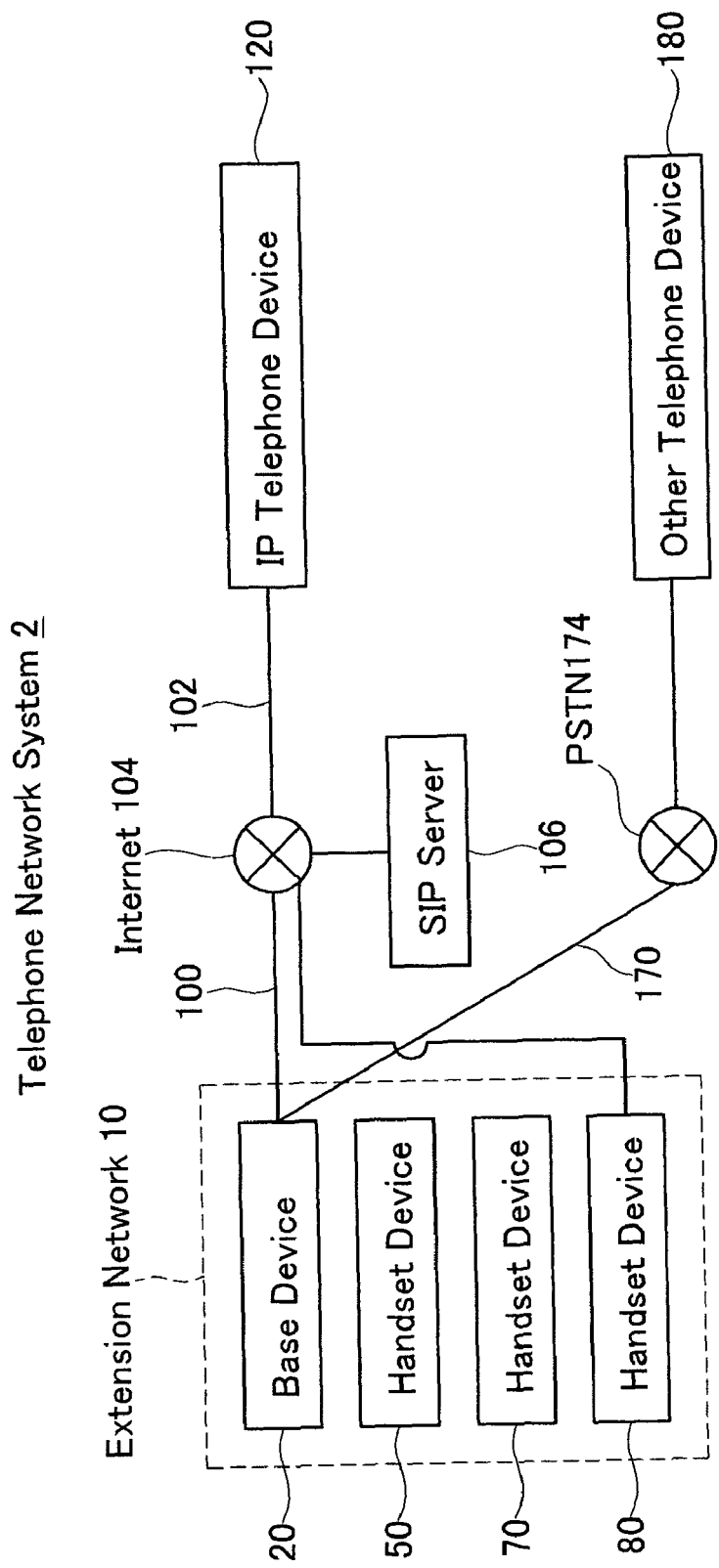
FIG. 1 shows an example of the schematic configuration of a telephone network system.

DETAILED DESCRIPTION OF THE PREFERRED EMBODIMENTS (First Embodiment)
FIG. 1 shows the telephone network system 2 of this embodiment.
(Overall System Configuration)
The telephone network system 2 comprises an extension network 10, an IP telephone device 120, the Internet 104, a SIP server 106, the PSTN 174, and another telephone device 180.

The extension network 10 comprises a base device 20 and a plurality of handset devices 50, 70, 80. The base device 20 is connected to the Internet 104 (an IP telephone network). A SIP URI is set in the base device 20. The SIP URI of the base device 20 may be set beforehand during the manufacturing stage of the base device 20. Further, the SIP URI of the base device 20 may also be arbitrarily set by the user. In this embodiment, the former approach, i.e. a preset SIP URI, is employed. The base device 20 is able to perform a telephone communication via the Internet 104. That is, the base device 20 functions as an IP telephone device. The base device 20 is also connected to the PSTN 174 (a public telephone network). The base device 20 is able to perform a telephone communication via the PSTN 174. That is, the base device 20 is also able to function as an ordinary telephone device.

The handset devices 50 and 70 do not have any software for performing an IP telephone communication. That is, the handset devices 50 and 70 are non-IP telephone devices. The handset devices 50 and 70 have software for using the base device 20 to perform telephone communications via the PSTN 174. Conversely, the handset device 80 has software for performing an IP telephone communication. That is, the handset device 80 has a preset SIP URI and is able to function as an IP telephone device. The handset device 80 also has software for using the base device 20 to perform a telephone communication via the PSTN 174.

The IP telephone device 120 is connected to the Internet 104. A SIP URI is preset in the IP telephone device 120. In this embodiment, the IP telephone device 120 functions only as the IP telephone device without functioning as an ordinary telephone device.

The SIP server 106 is able to store the SIP URI of each of the extension network 10 and the IP telephone device 120. The SIP server 106 stores an association of the IP address of the base device 20 and the SIP URI of the base device 20. The SIP server 106 stores an association of the IP address of the IP telephone device 120 and the SIP URI of the IP telephone device 120. That is, the base device 20 and IP telephone device 120 are registered to the SIP server 106. The SIP server 106 is also able to store the SIP URI of each of the handset devices 50, 70, 80. This point will be explained in detail further below. The SIP server 106 is connected to the Internet 104. The SIP server 106 controls the telephone communications performed between the extension network 10 and the IP telephone device 120. The various types of commands communicated between the extension network 10 and the IP telephone device 120 for telephone communications are sent via the SIP server 106. Furthermore, in this embodiment, the other telephone device 180 is connected to the PSTN 174.

Figure 2:
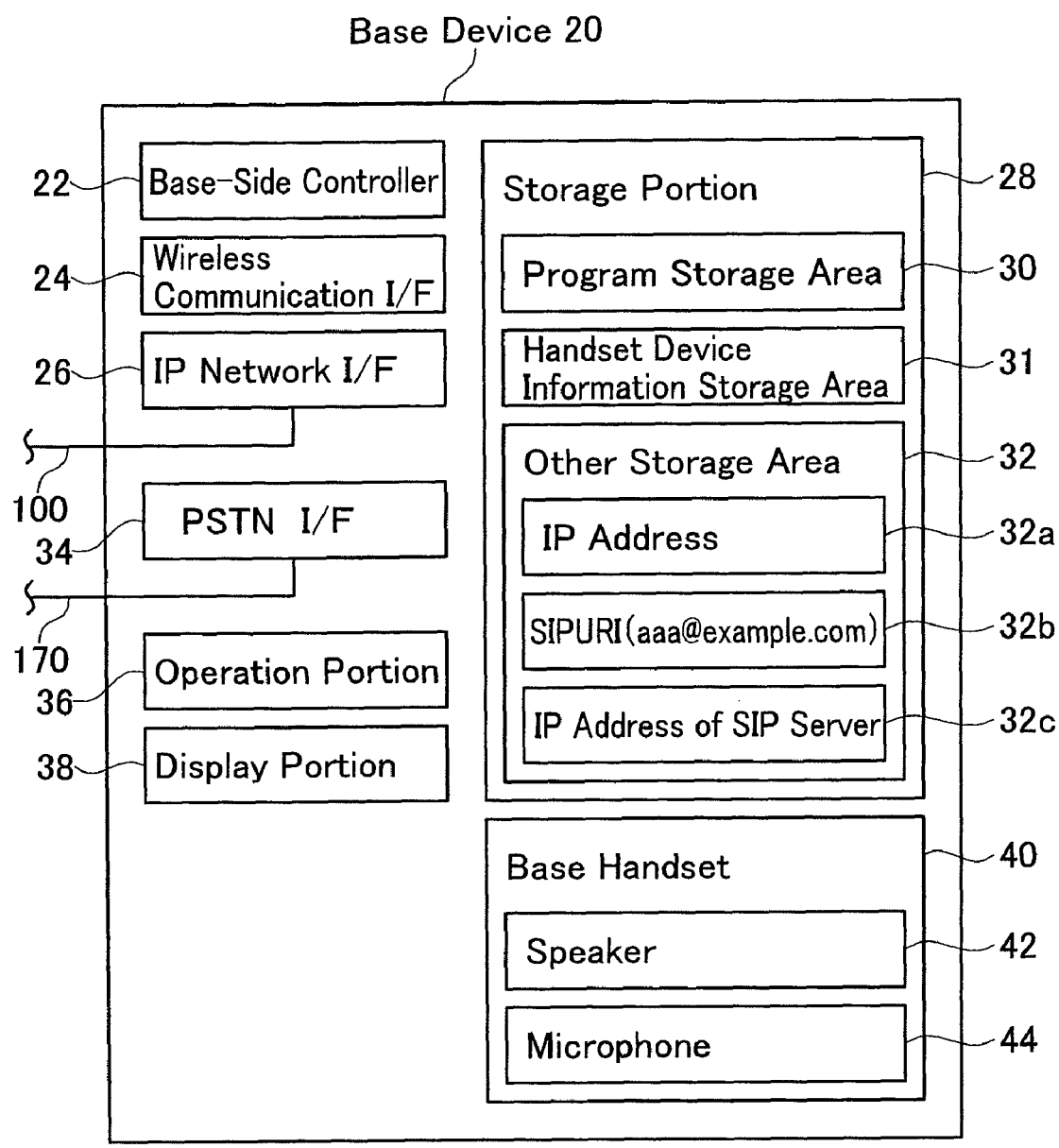
FIG. 2 shows an example of the schematic configuration of a base device.

(Base Device Configuration)
The configuration of base device 20 will be explained. FIG. 2 shows the configuration of the base device 20. The base device 20 comprises a base-side controller 22, a wireless communication interface 24, an IP network interface 26, a storage portion 28, a PSTN interface 34, an operation portion 36, a display portion 38, and a base handset 40. The base-side controller 22 executes various processes in accordance with programs stored in the storage portion 28. The contents of the processes executed by the base-side controller 22 will be explained in detail below. The wireless communication interface 24 is an interface for wireless communications with the respective handset devices 50, 70, 80. A LAN line 100 is connected to the IP network interface 26. The LAN line 100 is connected to the Internet 104 (cf. FIG. 1). The base device 20 is able to access the Internet 104 via the IP network interface 26 and the LAN line 100. A PSTN line 170 is connected to the PSTN interface 34. The PSTN line 170 is connected to the PSTN 174 (cf. FIG. 1). The base device 20 is able to perform a telephone communication via the PSTN 174 using the PSTN interface 34 and the PSTN line 170.

The storage portion 28 is configured from ROM, EEPROM, RAM and so forth. The storage portion 28 comprises a program storage area 30, a handset device information storage area 31, and another storage area 32. The program storage area 30 stores programs to be executed by the base-side controller 22. For example, the program storage area 30 stores a program for performing a telephone communication using the SIP, a program for performing a telephone communication via the PSTN, and a program for registering the handset devices 50, 70, 80 to the base device 20.

Figures 3, 4:
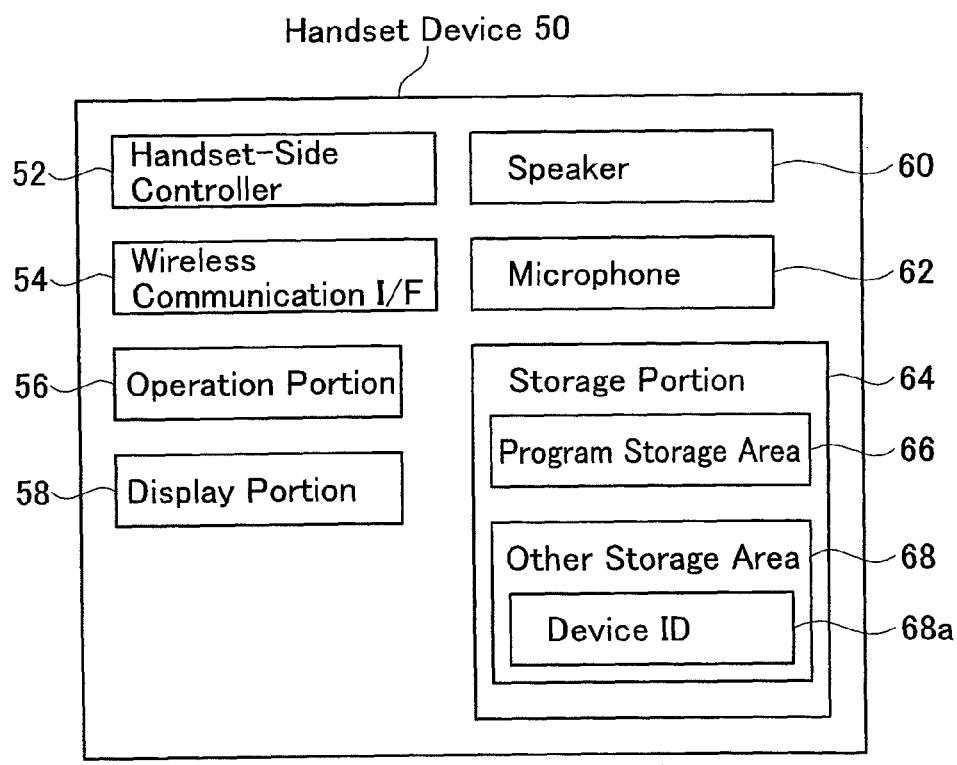
FIG. 3 shows an example of the contents stored in the handset device information storage area.
FIG. 4 shows an example of the schematic configuration of a handset device.

The handset device information storage area 31 stores information related to the handset devices 50, 70, 80. FIG. 3 shows an example of the stored contents of the handset device information storage area 31. The handset device information storage area 31 is able to store a plurality of association information 200, 202, 204. The respective association information 200, 202, 204 associates a handset device ID 210 and a SIP URI 212. In this embodiment, it is supposed that association information 200 corresponds to the handset device 50, association information 202 corresponds to the handset device 70 and association information 204 corresponds to the handset device 80. The handset device ID 210 may be set beforehand in the handset devices 50, 70, 80, or alternately, may be assigned to each of the handset devices 50, 70, 80 by base device 20. The former approach is employed in this embodiment. This will be explained in detail below, but the base device 20 generates the SIP URI of the handset devices 50 and 70, which are the non-IP telephone devices, and registers this SIP URI to the SIP server 106. This SIP URI is stored in the SIP URI 212 column of the handset device information storage area 31. Furthermore, the base device 20 stores only the handset device ID of handset device 80, which is the IP telephone device, and does not store the SIP URI of this handset device 80 (cf. association information 204).

The other storage area 32 is able to store information other than the information to be stored in storage areas 30 and 31. The other storage area 32, for example, stores the IP address 32a that is set in the base device 20, the SIP URI 32b that is set in the base device 20, and the IP address 32c of the SIP server 106. Furthermore, in this embodiment, the SIP URI 32b of the base device 20 is "aaa@example.com".

The operation portion 36 comprises a plurality of keys. The user is able to input various information into the base device 20 by operating the operation portion 36. The display portion 38 is able to display a variety of information. The base handset 40 comprises a speaker 42 and a microphone 44. The base handset 40 may be connected to the base device main unit via a wire, or may be connected wirelessly. The user is able to perform a call using the speaker 42 and the microphone 44. The user is able to make a phone call from the base device 20 and to take a phone call via the base device 20 using the base handset 40.

(Handset Device Configuration)

Next, the configuration of handset device 50 will be explained. The handset device 50 of this embodiment is a cordless type. FIG. 4 shows the configuration of handset device 50. The handset device 50 comprises a handset-side controller 52, a wireless communication interface 54, an operation portion 56, a display portion 58, a speaker 60, a microphone 62, and a storage portion 64. The handset-side controller 52 executes various processes in accordance with a program stored in the storage portion 64. The contents of the processes executed by the handset-side controller 52 will be explained below as needed. The wireless communication interface 54 is an interface for wireless communication with the base device 20.

The operation portion 56 comprises a plurality of keys. For example, the operation portion 56 has a hook key and numeric keypads. When not in use, the handset device 50 is in the on-hook state. A user may operate the hook key when using the handset device 50 to place a phone call. Consequently, the handset device 50 transitions to the off-hook state. Next, the user inputs the telephone identification information (either the SIP URI or the PSTN telephone identification information) of the call request destination into the handset device 50 by operating the numeric keypads (or by operating the speed dial function). Consequently, the user is thereby able to place a phone call. Furthermore, the user may place a phone call even in the off-hook state by inputting the telephone identification information first and then subsequently operating the hook key. Further, the user may set the handset device 50 to the off-hook state by operating the hook key while a telephone call is being placed to the handset device 50 (i.e. during a call request notice). Consequently, the user is thereby able to take a telephone call. Hereinafter, setting the handset device 50 to the off-hook state in order to place a phone call and also to take an incoming phone call shall be called the "call start operation".

The display portion 58 is able to display a variety of information. The user may perform a phone call using the speaker 60 and the microphone 62. The storage portion 64 comprises a program storage area 66 and another storage area 68. The program storage area 66 stores a program to be executed by the handset-side controller 52. For example, the program storage area 66 stores a program for performing a wireless communication with the base device 20, and a program for registering the handset device 50 to the base device 20. The program storage area 66 does not store a program for performing an IP telephone communication. For this reason, less ROM capacity is needed to store the programs. Further, the handset device 50 need not be equipped with the hardware for performing an IP telephone communication. Simplifying the configuration in terms of both hardware and software makes it possible to reduce the manufacturing costs of the handset device 50. The other storage area 68 may store information other than the information that is to be stored in the program storage area 66. The other storage area 68, for example, stores the device ID 68a of the handset device 50.

The handset device 70 comprises the same configuration as handset device 50. However, the handset device 70 stores a different handset device ID than that of the handset device 50. Further, the handset device 80 also comprises the same configuration as the handset device 50. However, the handset device 80 stores a program for performing an IP telephone communication. The handset device 80 stores its own SIP URI. Further, the handset device 80 stores a different handset device ID from those of the handset devices 50 and 70.

(Configurations of Other Devices)

Furthermore, the IP telephone device 120 comprises the same configuration as the base device 20. However, the IP telephone device 120 is not able to perform a telephone communication via the PSTN 174. Configuration regarding this point differs from the base device 20. The IP telephone device 120 is able to access the Internet 104 via a LAN line 102. Further, the other telephone device 180 may comprise the same configuration as the well-known, ordinary telephone device that performs a telephone communication via the public telephone network, and as such, a detailed explanation of the other telephone device 180 will be omitted. The other telephone device 180 is able to perform a telephone communication via the PSTN 174.

(Registration Process)

Next, the contents of the process executed by the base-side controller 22 will be explained. The contents of the registration process will be explained first. The execution of the registration process is triggered by the following operation executed by the user. For example, the handset device 50 must be registered to the base device 20 in order to perform a telephone communication via the PSTN 174 from the handset device 50. That is, the initial registration of the handset device 50 is required. For this reason, the user executes a predetermined operation (for example, a predetermined key operation) at the operation portion 56 of the handset device 50 (cf. FIG. 4). This predetermined operation may also be called the "operation for setting the handset device 50 to the registration mode". In addition, the user executes a predetermined operation (for example, a predetermined key operation) at the operation portion 36 of the base device 20 as well (cf. FIG. 2). This predetermined operation may also be called the operation for setting the base device 20 to the registration mode. Consequently, the base-side controller 22 thereby executes the registration process. Furthermore, the trigger for executing the registration process is not limited to the above example. Alternately, the registration process may be executed in a case where the predetermined operation is executed at the operation portion 56 of the handset device 50 without the predetermined operation being executed at the operation portion 36 of the base device 20. Further, for example, the registration process may be executed in a case where the predetermined operation is executed at the operation portion 36 of the base device 20 without the predetermined operation being executed at the operation portion 56 of the handset device 50.

Figure 5:
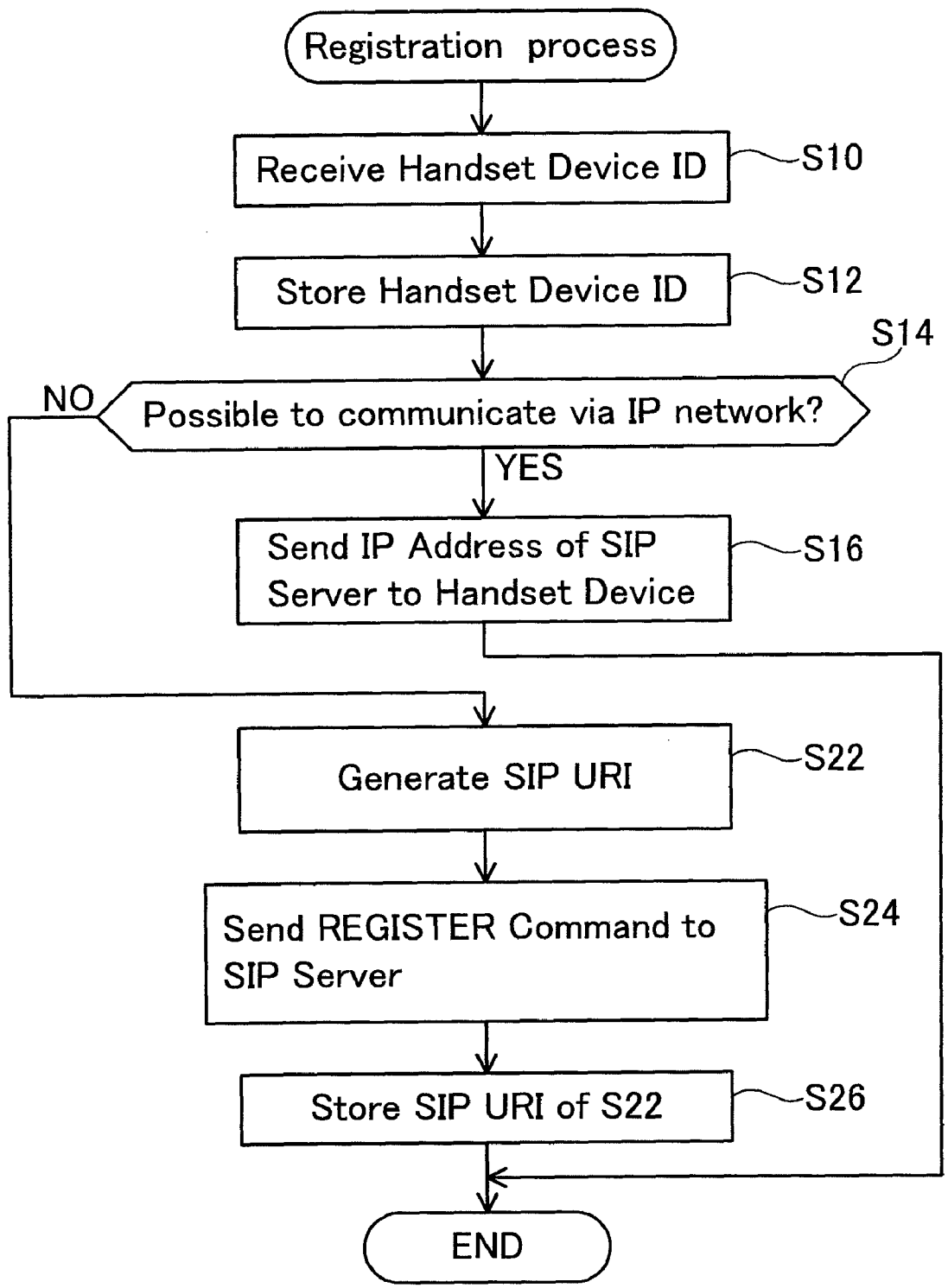
FIG. 5 shows a flowchart of a registration process.

FIG. 5 shows a flowchart of the registration process. The process below will be explained by giving an example of a registration process which is carried out by the base device 20 for the handset device 50 (as will be explained later in detail, a portion of the process is intended for the handset device 80). When the registration process is started, the handset device 50 sends the device ID 68a stored in the other storage area 68 (cf. FIG. 4) to the base device 20. The base device 20 thus receives the device ID 68a (S10). The base-side controller 22 secures an area for storing new association information 200 in the handset device information storage area 31, and stores the device ID 68a received in S10 in the handset device ID 210 column of this area (S12). In FIG. 3, "XXX" is stored as the handset device ID 210 of handset device 50. Furthermore, the base-side controller 22 may be configured to generate and store an identifier for handset device 50 without storing the handset device ID 210 sent from the handset device 50. The information stored in S12 may be any type information that makes it possible to specify handset device 50.

Further, when the registration process is started, the handset device 50, in addition to the device ID 68a, also sends to the base device 20 information denoting whether or not the handset device 50 itself is a model that is able to communicate via the IP network. The base-side controller 22, on the basis of this information, determines whether or not the handset device 50 is able to communicate via the IP network (S14). Because the handset device 50 of this embodiment is not able to communication via the IP network, a determination of NO is made in S14. In accordance with this, the process proceeds to S22.

On the other hand, for example, in a case where the registration process is executed for the handset device 80, which is able to communicate via the IP network, a determination of YES is made in S14. In this case, the base-side controller 22 sends to the handset device 80 the IP address 32c of the SIP server 106 stored in the other storage area 32 (cf. FIG. 2) (S16). Consequently, the handset device 80 is able to send the IP address and its own SIP URI to the SIP server 106. The SIP server 106 stores an association of the IP address of the handset device 80 and the SIP URI of the handset device 80. Hence, the handset device 80 is thereby registered to the SIP server 106. The registration process ends in a case where S16 ends.

On the other hand, in the case where the handset device is a non-IP telephone device, the base-side controller 22 generates a SIP URI for the handset device 50 in S22. In this embodiment, the base-side controller 22 generates a SIP URI that includes its own SIP URI 32b stored in the other storage area 32 (cf. FIG. 2). In this embodiment, the SIP URI 32b of the base device 20 is "aaa@example.com". For this reason, the base-side controller 22 generates a SIP URI in which at least one character (letter of the alphabet and/or number and/or predetermined symbol (hyphen, dot, underscore, etc.) is added to this character string. In this embodiment, "bbb.aaa@example.com" is generated as the SIP URI for handset device 50. Furthermore, the base-side controller 22 may randomly select the above "at least one character", or alternately, may select the character in accordance with a predetermined rule (i.e. a program). The base-side controller 22 generates a SIP URI that differs from the SIP URI already registered to the handset device information storage area 31. For example, in a case where the SIP URI of handset device 70 is already registered to the handset device information storage area 31, the base-side controller 22 generates a SIP URI that differs therefrom for handset device 50.

Next, the base-side controller 22 sends a REGISTER command to the SIP server 106 (S24). Furthermore, the base device 20 knows the IP address 32a of the SIP server 106 that is registered to itself. For this reason, it is possible to send the REGISTER command of S24 to the SIP server 106. The above REGISTER command includes the IP address 32a of the base device 20 (cf. FIG. 2) and the SIP URI generated in S22. The SIP server 106 stores an association of the IP address 32a of the base device 20 and the SIP URI of handset device 50. Consequently, the handset device 50 is thereby registered to the SIP server 106.

Next, the base-side controller 22 stores the SIP URI generated in S22 in the handset device information storage area 31 by associating this SIP URI with the handset device ID of the handset device 50 (S26). In FIG. 3, the SIP URI "bbb.aaa@example.com" is stored in association with the handset device ID "XXX" of handset device 50. The registration process ends in a case where S26 ends.

Furthermore, the handset device ID and the SIP URI of the handset device 70 are stored in the handset device information storage area 31 in accordance with the same registration process as in the case of handset device 50. In FIG. 3, the SIP URI "ccc.aaa@example.com" is stored in association with the handset device ID "YYY" of handset device 70. Further, the handset device 70 is registered to the SIP server 106. In a case where the handset devices 50, 70, 80 are stored in the handset device information storage area 31, the handset devices 50, 70, 80 are able to perform telephone communications via the PSTN network using the base device 20. Further, in a case where the handset devices 50 and 70 are stored in the handset device information storage area 31, the handset devices 50 and 70 are able to perform telephone communications via the IP network using the base device 20. Furthermore, the handset device 80, i.e. the IP telephone device, is able to perform a telephone communication directly via the IP network without relaying through the base device 20.

(Call Request Receiving Process)

Figure 6:
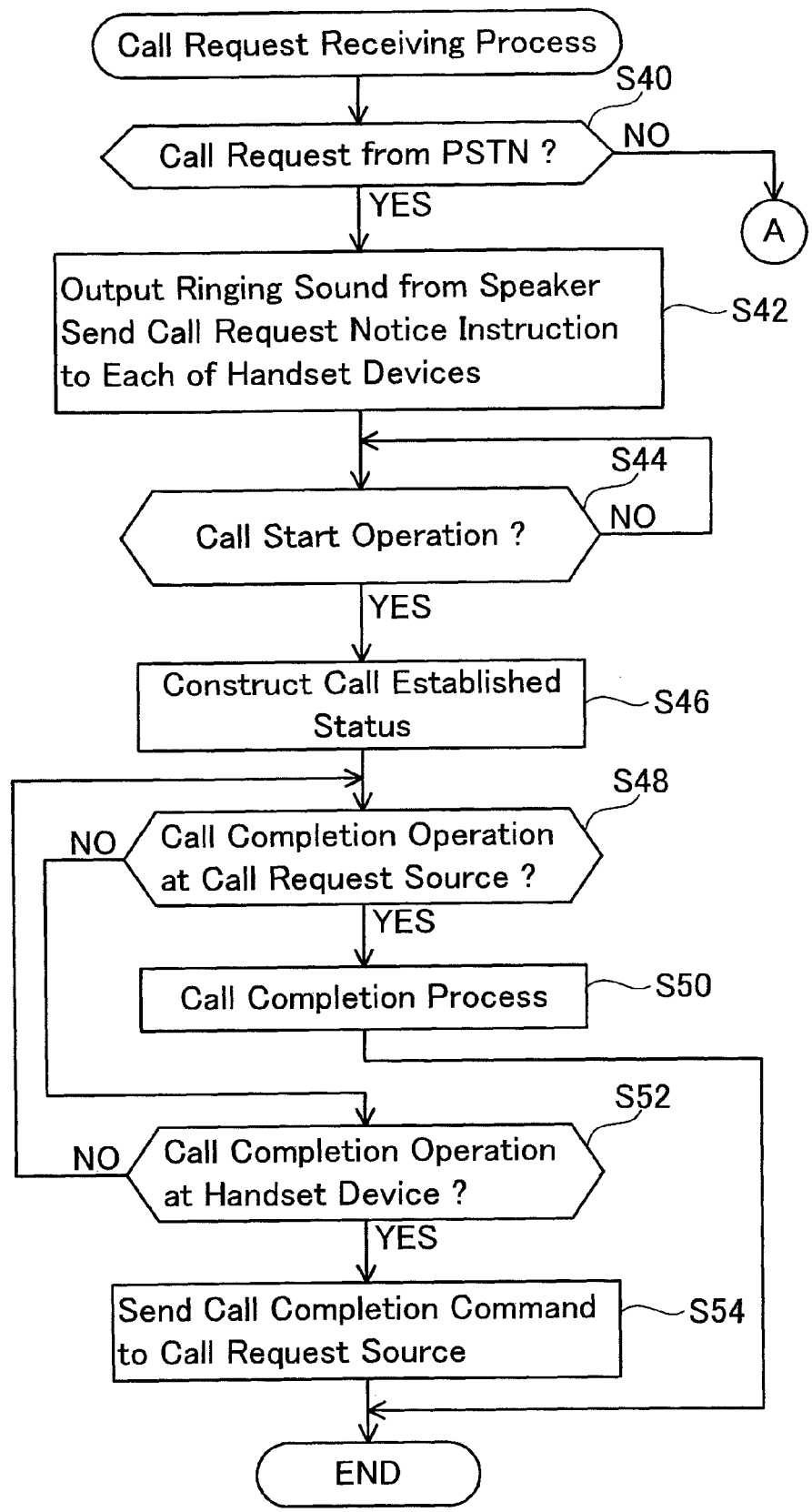
FIG. 6 shows a flowchart of a call request receiving process.

FIG. 6 shows a flowchart of the call request receiving process executed by the base-side controller 22. For example, the user of the IP telephone device 120 may place a phone call to the extension network 10 by inputting the SIP URI of the extension network 10 (the SIP URI of the base device 20 or either of the handset devices 50, 70). In so doing, a call request (INVITE) is sent to the SIP server 106 from the IP telephone device 120. This INVITE includes the SIP URI of IP telephone device 120 as a source, and the SIP URI of extension network 10 as a destination. The SIP server 106 receives the INVITE. The SIP server 106 stores (registers) an association of the SIP URI of each device 20, 50, 70 of the extension network 10 with the IP address of the base device 20. As it is, the SIP server 106 specifies the IP address of the base device 20 from the destination SIP URI included in the INVITE in a case where the destination SIP URI included in the INVITE is associated with any of the devices 20, 50, 70. The SIP server 106 transfers the INVITE using the IP address of the base device 20 as the destination thereof. Consequently, the INVITE is received by the IP network interface 26 of the base device 20 (cf. FIG. 2). In accordance with the aforementioned processes, the call request receiving process is executed.

Further, the user of the other telephone device 180 may place a phone call to the extension network 10 by inputting the PSTN telephone identification information (numbers) of the extension network 10 into the other telephone device 180. In this case, a call request is sent to the PSTN 174 from the other telephone device 180. Consequently, the call request is received by the PSTN interface 34 (cf. FIG. 2). The call request receiving process is executed in this case as well.

Furthermore, the user of the IP telephone device 120 may place a phone call to the handset device 80 by inputting the SIP URI of handset device 80. In this case, an INVITE is sent to the SIP server 106 from the IP telephone device 120. This INVITE includes the SIP URI of the IP telephone device 120 as the source, and the SIP URI of the handset device 80 as the destination. The SIP server 106 stores (registers) an association of the SIP URI of the handset device 80 and the IP address of handset device 80. Based on this stored information, the SIP server 106 may specify the IP address of the handset device 80 from the destination SIP URI included in the INVITE. The SIP server 106 transfers the INVITE using the IP address of handset device 80 as the destination thereof. Consequently, the INVITE is received by the handset device 80. In accordance with this, the handset device 80 executes a call request notice (outputs a ringing sound). In a case where a call start operation is performed at the handset device 80, a RTP (Real-time Transport Protocol) communication session for calling is established between the handset device 80 and the IP telephone device 120. It becomes possible to perform a telephone communication between the handset device 80 and the IP telephone device 120. The handset device 80 is able to perform the telephone communication via the IP network without going through the base device 20.

The base-side controller 22 determines if the call request is via the PSTN 174 or via the Internet 104 (S40). This determination is made by determining which interface, 26 or 34, has received the call request. In a case where the call request is via the PSTN 174, the base-side controller 22 makes a determination of YES in S40. The process proceeds to S42 in this case. Conversely, in a case where the call request is via the Internet 104, the base-side controller 22 makes a determination of NO in S40. In this case, the process proceeds to S70 of FIG. 7.

Furthermore, the process of S42 and beyond will be explained using the example in which the call request is received from the other telephone device 180 in S40. In S42, the base-side controller 22 outputs a ringing sound from the speaker 42 of the base device 20 (cf. FIG. 2). Further, the base-side controller 22 sends a call request notice instruction to each of the handset devices 50, 70, 80. Upon receiving the call request notice instruction, each of the handset devices 50, 70, 80 (specifically, the handset-side controller 52 in the case with the handset device 50) executes a call request notice. For example, each handset device outputs a ringing sound from the speaker 60 in a case where the call request notice (outputting of the ringing sound) is executed, the user knows that a phone call is incoming.

The base-side controller 22 monitors for a call start operation (i.e. a hook key operation) being performed at any of the base handset 40 and handset devices 50, 70, 80 (S44). Furthermore, in a case where the phone call is disconnected at the other telephone device 180 (a case where an on-hook operation is performed at the other telephone device 180) prior to the call start operation being performed at any of the handset devices, the base-side controller 22 stops the outputting of the ringing sound for the speaker 42 of the base device 20. In addition, the base-side controller 22 sends an instruction for stopping the call request notice at each of the handset devices 50, 70, 80. Consequently, each of the handset devices 50, 70, 80 stops the call request notice.

In a case where the user picks up the base handset 40 (i.e. in a case where the base handset 40 is set to the off-hook state), the base-side controller 22 makes a determination of YES in S44. Further, in a case where the hook key is operated during a call request notice, the handset devices 50, 70, 80 send to the base device 20 information denoting that a call start operation has been performed. In a case where this information is received by the base device 20 (the wireless interface 24), the base-side controller 22 makes a determination of YES in S44. Furthermore, this information includes the handset device ID of the handset device at which the call start operation was performed. For this reason, the base-side controller 22 knows which handset device the call start operation was performed at. In a case where the determination in S44 is YES, the base-side controller 22 stops outputting the ringing sound from the base device 20 speaker 42. Further, the base-side controller 22 sends an instruction for stopping the call request notice to each of the handset devices 50, 70, 80.

Next, the base-side controller 22 constructs a call established status between the handset at which the call start operation was performed in S44 and the other telephone device 180 (S46). For example, in a case where the handset device at which the call start operation was performed in S44 is the base handset 40, the base-side controller 22 outputs voice data via the PSTN network 174 from the speaker 42, and sends voice data inputted via the microphone 44 to the PSTN network 174. Further, for example, in a case where the handset device at which the call start operation was performed in S44 is the handset device 50, the base-side controller 22 transfers the voice data from the PSTN network 174 to the handset device 50, and transfers the voice data from the handset device 50 to the PSTN network 174.

In a case where a call completion operation is performed at the other telephone device 180 (a case where an on-hook operation is performed at the other telephone device 180), the other telephone device 180 sends a predetermined command to the extension network 10. The base-side controller 22 monitors for the reception of this predetermined command (S48). In a case where the determination in S48 is YES, the base-side controller 22 executes a call completion process (S50). For example, in a case where the handset device at which the call start operation was performed in S44 is the handset device 50, the base-side controller 22 sends to the handset device 50 information denoting that the telephone has been disconnected. The call request receiving process ends in a case where S50 ends.

Further, the base-side controller 22 monitors for a call completion operation to be performed at the handset device at which the call start operation was performed in S44 (S52). For example, in a case where the handset device at which the call start operation was performed in S44 is the base handset 40, when the base handset 40 is returned to its original location (a case where an on-hook operation is performed), the base-side controller 22 makes a determination of YES in S52. Further, for example, in a case where the handset device at which the call start operation was performed in S44 is the handset device 50, when a call completion operation is performed at the handset device 50 (a case where an on-hook operation is performed), the handset device 50 sends to the base device 20 information denoting that a call completion operation has been performed. In this case, the base-side controller 22 makes a determination of YES in S52. In a case where the determination in S52 is YES, the base-side controller 22 sends a predetermined command (a call completion command) to the other telephone device 180 (S54). Consequently, the call request receiving process ends.

Figure 7:
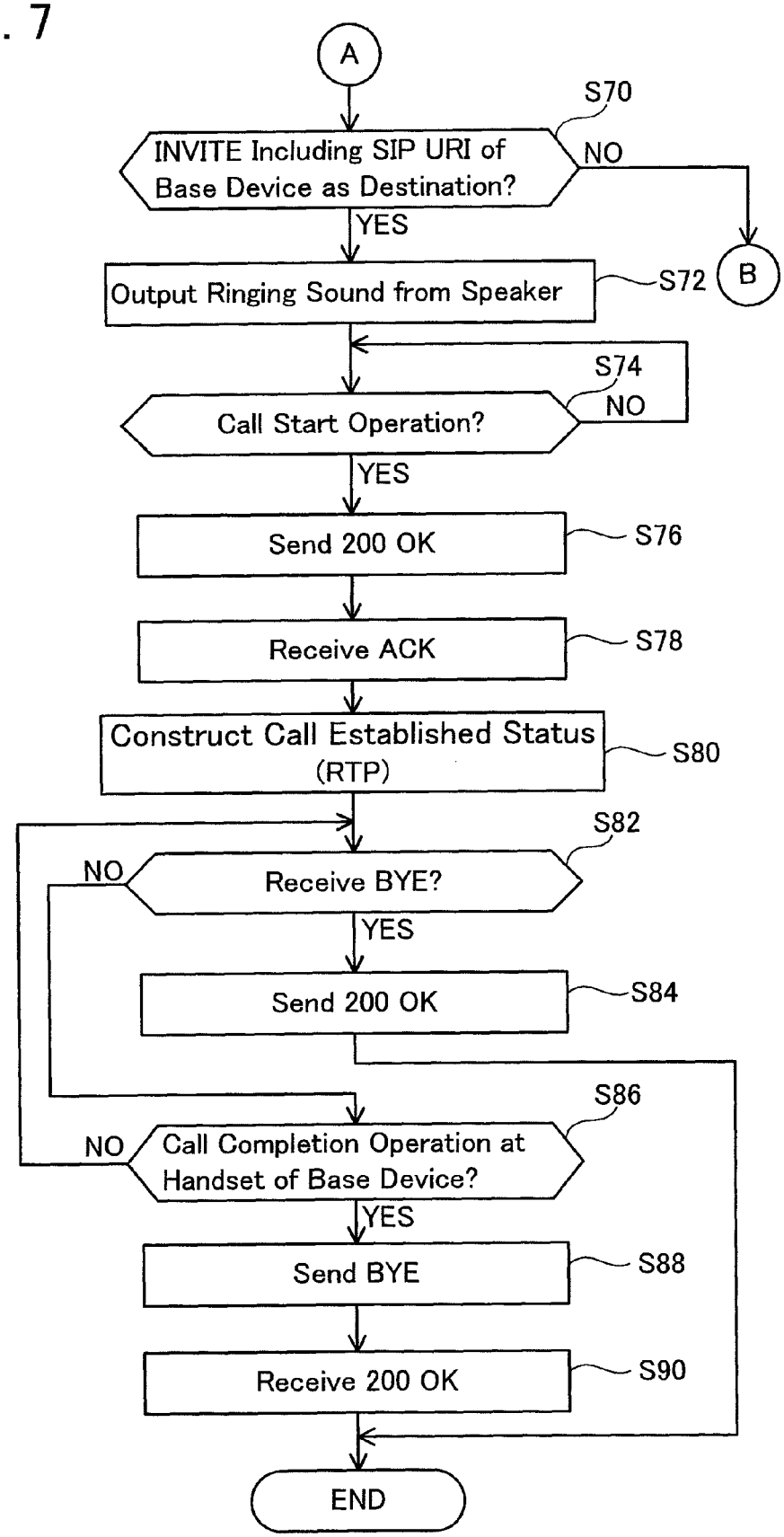
FIG. 7 shows the continuation of the flowchart of FIG. 6.

Next, the process executed in a case where a call request (i.e. an INVITE) is received via the Internet 104 will be explained. In a case where an INVITE is received via the Internet 104, a determination of NO is made in S40, and S70 of FIG. 7 is executed. The process of S70 and beyond will be explained by giving an example in which an INVITE sent from the IP telephone device 120 has been received.

In S70, the base-side controller 22 determines if the SIP URI of the destination included in the INVITE is the SIP URI 32b of the base device 20 (cf. FIG. 2), or the SIP URI of either of the handset devices 50 and 70. In a case where the SIP URI of the destination included in the INVITE is the SIP URI 32b of the base device 20, a determination of YES is made in S70 and the process proceeds to S72. In a case where the SIP URI of the destination included in the INVITE is the SIP URI of either handset device 50 or 70, a determination of NO is made in S70 and the process moves to S110 of FIG. 8.

In S72, the base-side controller 22 outputs a ringing sound from the speaker 42 of the base device 20 (cf. FIG. 2). A call request notice instruction is not sent to each of the handset devices 50, 70, 80 here. Next, the base-side controller 22 monitors for a call start operation (i.e. a hook key operation) to be performed at the base handset 40 (S74). In a case where the determination here is YES, the base-side controller 22 sends a 200 OK to the SIP server 106. The SIP server 106 transfers the 200 OK to the IP telephone device 120. The IP telephone device 120, upon receiving the 200 OK, sends an ACK to the SIP server 106. The SIP server 106 transfers the ACK to the extension network 10 (base device 20). The base device 20 receives the ACK (S78). Consequently, a RTP (Real-time Transport Protocol) communication session for calling is established (S80).

Voice data inputted to the IP telephone device 120 is sent to the SIP server 106. The SIP server 106 transfers the voice data to the extension network 10 (base device 20). The base-side controller 22 outputs the voice data from the SIP server 106 via the speaker 42. Further, the base-side controller 22 sends the voice data inputted to the microphone 44 to the SIP server 106. The SIP server 106 transfers the voice data to the IP telephone device 120. A call is thereby able to be performed between the base handset 40 and the IP telephone device 120.

In a case where a call completion operation has been performed at the IP telephone device 120 (a case where an on-hook operation has been performed), the IP telephone device 120 sends a BYE to the SIP server 106. The SIP server 106 transfers the BYE to the extension network 10 (base device 20). The base device 20 receives the BYE. In accordance with this, the base-side controller 22 makes a determination of YES in S82, and sends a 200 OK to the SIP server 106 (S84). The SIP server 106 transfers the 200 OK to the IP telephone device 120. Consequently, the RTP communication session for calling is disconnected, and the call request receiving process ends.

Further, the base-side controller 22 monitors for a call completion operation to be performed at the base handset 40 (S86). In a case where the determination here is YES, the base-side controller 22 sends a BYE to the SIP server 106 (S88). The SIP server 106 transfers the BYE to the IP telephone device 120. The IP telephone device 120, upon receiving the BYE, sends a 200 OK to the SIP server 106. The SIP server 106 transfers the 200 OK to the extension network 10 (base device 20). The base device 20 receives the 200 OK (S90). Consequently, the RTP communication session for calling is disconnected, and the call request receiving process ends.

Next, the process executed in a case where the SIP URI of the destination included in an INVITE via the Internet 104 is the SIP URI of either handset device 50 or 70 will be explained. That is, the process executed in a case where the determination in S70 is NO will be explained. In the case where the determination in S70 is NO, the process proceeds to S110 of FIG. 8.

In 110, the base-side controller 22 specifies, from the information in the handset device information storage area 31 (cf. FIG. 2), the handset device ID associated to the SIP URI of the destination included in the INVITE. For example, in a case where the SIP URI of the destination included in the INVITE is "bbb.aaa@example.com", the base-side controller 22 specifies handset device ID "XXX" of the handset device 50 (cf. FIG. 3). The process below will be explained by giving an example in which the handset device ID of the handset device 50 has been specified in S110.

The base-side device 22 confirms the status of handset device 50 (S112). Specifically, the base-side controller 22 sends a status confirmation command to the handset device 50. The handset device 50, upon receiving the status confirmation command, sends information denoting its own status (busy status, waiting status, and the like) to the base device 20. Based on this information, the base-side controller 22 determines whether or not the handset device 50 is in a waiting status (S114). In a case where the determination here is NO, the base-side controller 22 sends a 486 Busy Here to the SIP server 106 (S116). The SIP server 106 transfers the 486 Busy Here to the IP telephone device 120. Consequently, the IP telephone device 120 is able to output a sound indicating busy. The user of the IP telephone device 120 knows that the handset device 50 is busy. The call request receiving process ends in a case where S116 ends.

On the other hand, in a case where the determination in S114 is YES, the base-side controller 22 sends a call request notice instruction to the handset device 50 specified in S110 (S118). That is, the base-side controller 22 sends a call request notice instruction that includes the handset device ID of handset device 50 as the destination thereof via wireless communication. That is, the call request notice instruction herein is not sent to the handset devices 70 and 80. Further, a ringing sound is not outputted from the base device 20 speaker 42. The handset device 50, upon receiving the call request notice instruction, executes the call request notice (outputs a ringing sound). The user thereby knows that a phone call has been placed to the handset device 50.

The base-side controller 22 monitors for a call start operation to be performed at the handset device 50 (S120). In a case where the hook key is operated during the call request notice, the handset device 50 sends to the base device 20 information denoting that a call start operation has been performed. The base-side controller 22, upon receiving this information, makes a determination of YES in S120. In accordance with this, the base-side controller 22 sends a 200 OK to the SIP server 106 (S122). The SIP server 106 transfers the 200 OK to the IP telephone device 120. The IP telephone device 120, upon receiving the 200 OK, sends an ACK to the SIP server 106. The SIP server 106 transfers the ACK to the extension network 10 (specifically, the base device 20). The base device 20 receives the ACK (S124). Consequently, an RTP communication session for calling is established (S126).

Voice data inputted to the IP telephone device 120 is sent to the SIP server 106. The SIP server 106 then transfers the voice data to the extension network 10 (i.e. to the base device 20). The base-side controller 22 transfers the voice data from the SIP server 106 to the handset device 50. Consequently, the user of the handset device 50 is thereby able to hear the voice data from the IP telephone device 120. Conversely, voice data inputted to the handset device 50 by the user is sent to the base device 20. The base-side controller 22 transfers this voice data from the handset device 50 to the SIP server 106. The SIP server 106 transfers the voice data to the IP telephone device 120. Consequently, the user of the IP telephone device 120 is able to hear the voice data from the handset device 50. It is thereby possible to establish a call between the handset device 50 and the IP telephone device 120.

Figure 9:
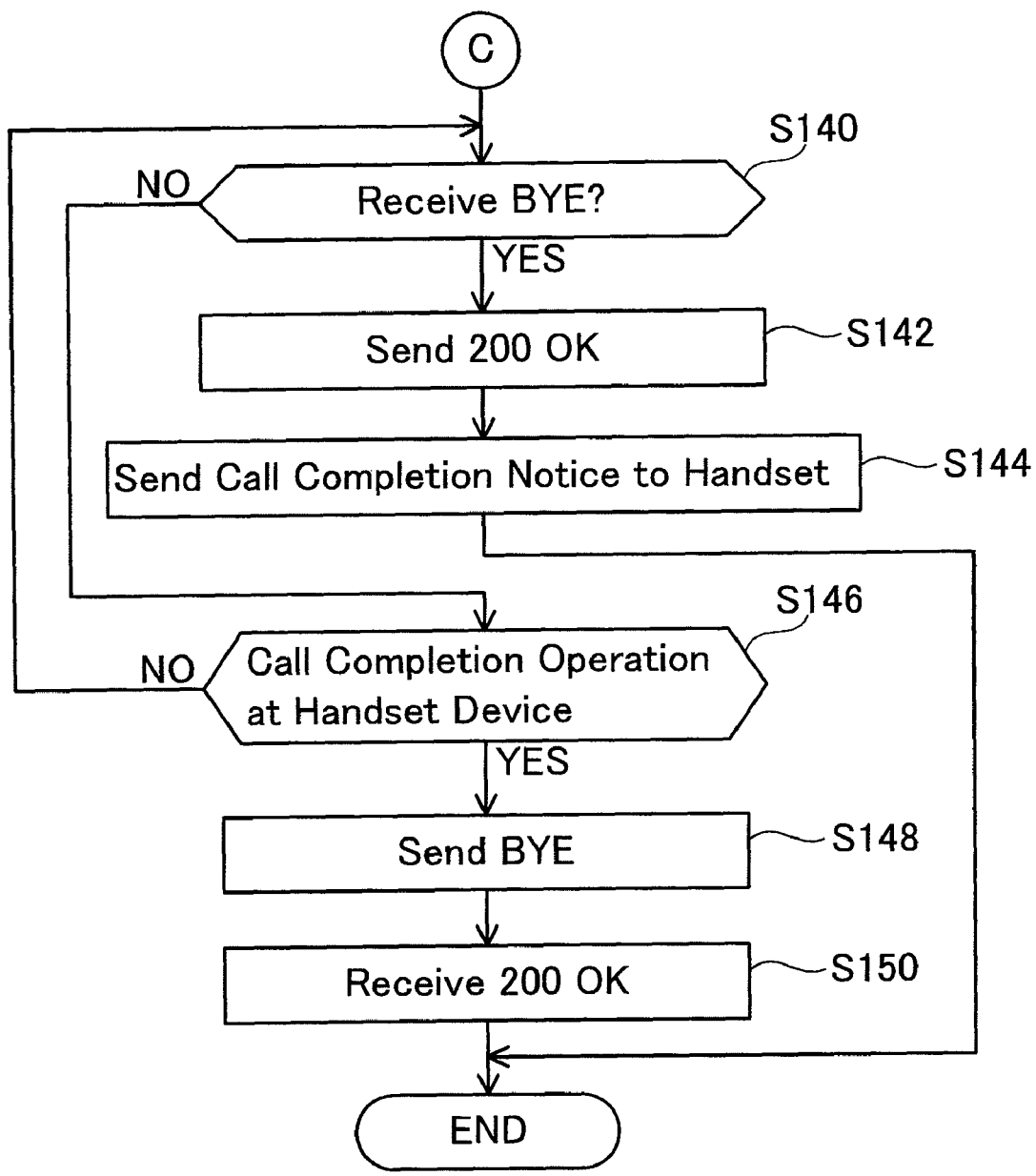
FIG. 9 shows the continuation of the flowchart of FIG. 8.

In a case where S126 ends, the process moves to S140 of FIG. 9. The base-side controller 22 monitors for the reception of a BYE (S140). In a case where the determination here is YES, the base-side controller 22 sends a 200 OK to the SIP server 106 (S142). Consequently, the RTP communication session for calling is disconnected. The base-side controller 22 sends the handset device 50 information (a call completion notice) denoting that the BYE has been received (S144). The handset device 50 (the handset-side controller 52) outputs a predetermined sound from the speaker 60 (cf. FIG. 4). The user of the handset device 50 knows that the phone call has been disconnected. The call request receiving process ends in a case where S144 ends.

Further, the base-side controller 22 monitors for a call completion operation to be performed at the handset device 50 (S146). In a case where the determination here is YES, the base-side controller 22 sends a BYE to the SIP server 106 (S148). The base device 20 receives a 200 OK (S150). Consequently, the RTP communication session for calling is disconnected, and the call request receiving process ends.

(Call Request Sending Process)

Next, the process executed by the base-side controller 22 in a case where placing a phone call will be explained. Furthermore, in this embodiment, the process in a case where a phone call is placed from the handset device 50 via the Internet 104 will be explained. The same process is also executed in a case where a phone call is placed via the Internet 104 from either the base device 20 or the handset device 70. A detailed explanation of the process in a case where a phone call is placed from either the base device 20 or the handset devices 50, 70, 80 via the PSTN 174 will be omitted since known techniques may be used.

Figure 10:
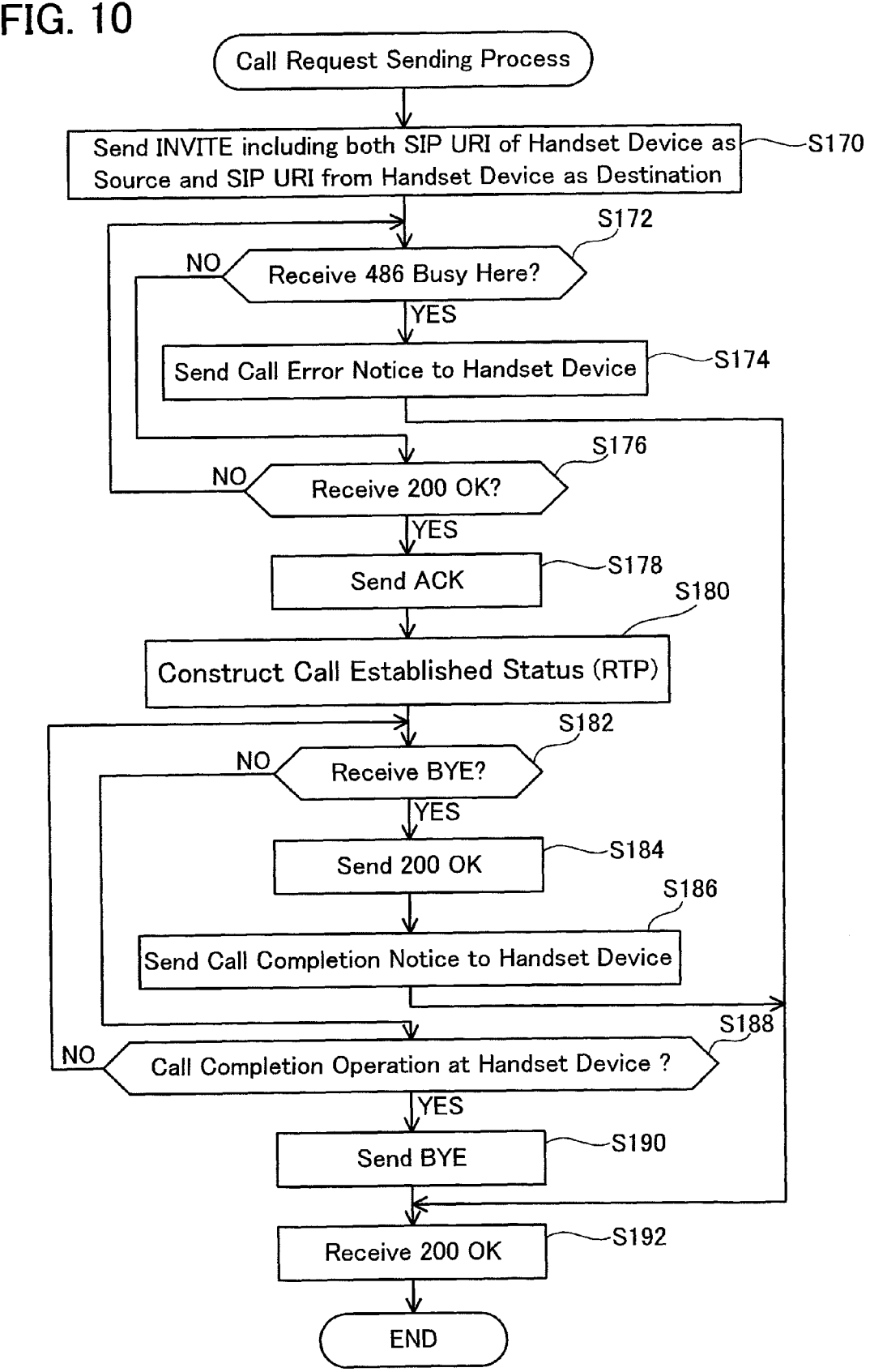
FIG. 10 shows a flowchart of a call request sending process.

The user of the handset device 50 may input the SIP URI of the party he wishes to call into the handset device 50 by operating the operation portion 56 (cf. FIG. 4). In this embodiment, it is supposed that the SIP URI of the IP telephone device 120 has been inputted. In this case, the handset device 50 sends to the base device 20 the SIP URI of the IP telephone device 120 and its own handset device ID (i.e. the handset device ID "XXX"). The base-side controller 22, upon receiving this information, executes the process shown in the flowchart of FIG. 10.

The base-side controller 22 specifies from the handset device information storage area 31 the SIP URI "bbb.aaa@example.com", which is associated to the handset device ID "XXX" of the handset device 50 in the handset device information storage area 31. The base-side controller 22 sends to the SIP server 106 an INVITE, which includes the SIP URI of the handset device 50 as the source and the SIP URI of the IP telephone device 120 as the destination (S170). The SIP server 106 stores (registers) an association of the SIP URI of the IP telephone device 120 and the IP address of the IP telephone device 120. For this reason, the SIP server 106 is able to specify the IP address of the IP telephone device 120 from the SIP URI of the destination included in the INVITE. The SIP server 106 transfers the INVITE using the IP address of the IP telephone device 120 as the destination. Consequently, the INVITE is received by the IP telephone device 120.

Furthermore, if a call completion operation is performed at the handset device 50 between the time that the execution of the process of S170 has ended and a determination of YES has been made in either S172 or S176, the base-side controller 22 sends the SIP server 106 (the IP telephone device 120) a cancel command. In this case, the call request sending process ends.

The IP telephone device 120, upon receiving the INVITE while busy, sends a 486 Busy Here to the SIP server 106. The SIP server 106 transfers the 486 Busy Here to the base device 20. In accordance with this, the base-side controller 22 makes a determination of YES in S172, and sends the handset device 50 information (a call error notice) denoting busy (S174). Consequently, the handset device 50 (handset-side controller 52) is able to output a sound indicating busy. The user of the handset device 50 knows that the IP telephone device 120 is busy. The call request sending process ends in a case where S174 ends.

On the other hand, the IP telephone device 120, upon receiving the INVITE while waiting, executes a call request notice. In a case where a call start operation is performed by the user of the IP telephone device 120, the IP telephone device 120 sends a 200 OK to the SIP server 106. The SIP server 106 transfers the 200 OK to the base device 20. In accordance with this, the base-side controller 22 makes a determination of YES in S176, and sends the SIP server 106 an ACK. The SIP server 106 transfers the ACK to the IP telephone device 120. Consequently, an RTP communication session for calling is established (S180). The point at which the base-side controller 22 relays the voice data communication is the same as the process of S126 of FIG. 8. Furthermore, since the process of S182 through S192 is the same as the processing of S140 through S150 of FIG. 9, a detailed explanation of this process will be omitted.

The telephone network system 2 of this embodiment has been explained in detail. In this system 2, the base device 20 generates the SIP URI of the handset devices 50 and 70, i.e.

the non-IP telephone devices, and registers these SIP URIs to the SIP server 106. The base device 20 relays voice data between the handset devices 50, 70 and the SIP server 106. Consequently, it is thereby possible for the handset devices 50, 70 to perform telephone communications via the Internet 104. Utilizing the technology of this embodiment makes it possible for a non-IP telephone device to function as an IP telephone device. The handset device 80, which functions as an IP telephone device, executes a phone call via the PSTN 174 by way of the base device 20 the same as the other handset devices 50, 70. Conversely, in a case where the handset device 80 executes a phone call via the IP network, the phone call is performed without going through the base device 20.

Further, the base device 20 generates for the handset devices 50, 70 SIP URI that include its own SIP URI. Since the SIP URI of the base device 20 is unique, the SIP URI of the handset devices 50, 70 are also unique. It is thereby possible to prevent a plurality of the same SIP URI from being registered to the SIP server 106.

Further, in the above system 2, the initial registration of the handset devices 50, 70 to the base device 20 may serve as the trigger for registering the handset devices 50, 70 to the SIP server 106. The handset devices 50, 70 are automatically registered to the SIP server 106 in a case where the user performs the operation for the initial registration of the handset devices 50, 70 to the base device 20. The user does not have to perform an operation for registering the handset devices 50, 70 to the SIP server 106.

(Second Embodiment)

The features in which the second embodiment differs from the first embodiment will be explained hereinbelow. In this embodiment, the contents stored in the handset device information storage area 31 of the base device 20 differ. FIG. 11 shows an example of the stored contents of the handset device information storage area 31 of this embodiment. The handset device information storage area 31 is able to store a plurality of association information 230, 232, 234. The respective association information 230, 232, 234 associates a handset device ID 210, a SIP URI 212 and a port number 214. In this embodiment, it is supposed that the association information 230 corresponds to the handset device 50, the association information 232 corresponds to the handset device 70, and the association information 234 corresponds to the handset device 80. The handset device ID 210 and the SIP URI 212 are the same as in the first embodiment. The port number 214 is the number of the port capable of being used at the base device 20. The storing of a port number 214 will be explained in detail next.

(Registration Process)

Figure 12:
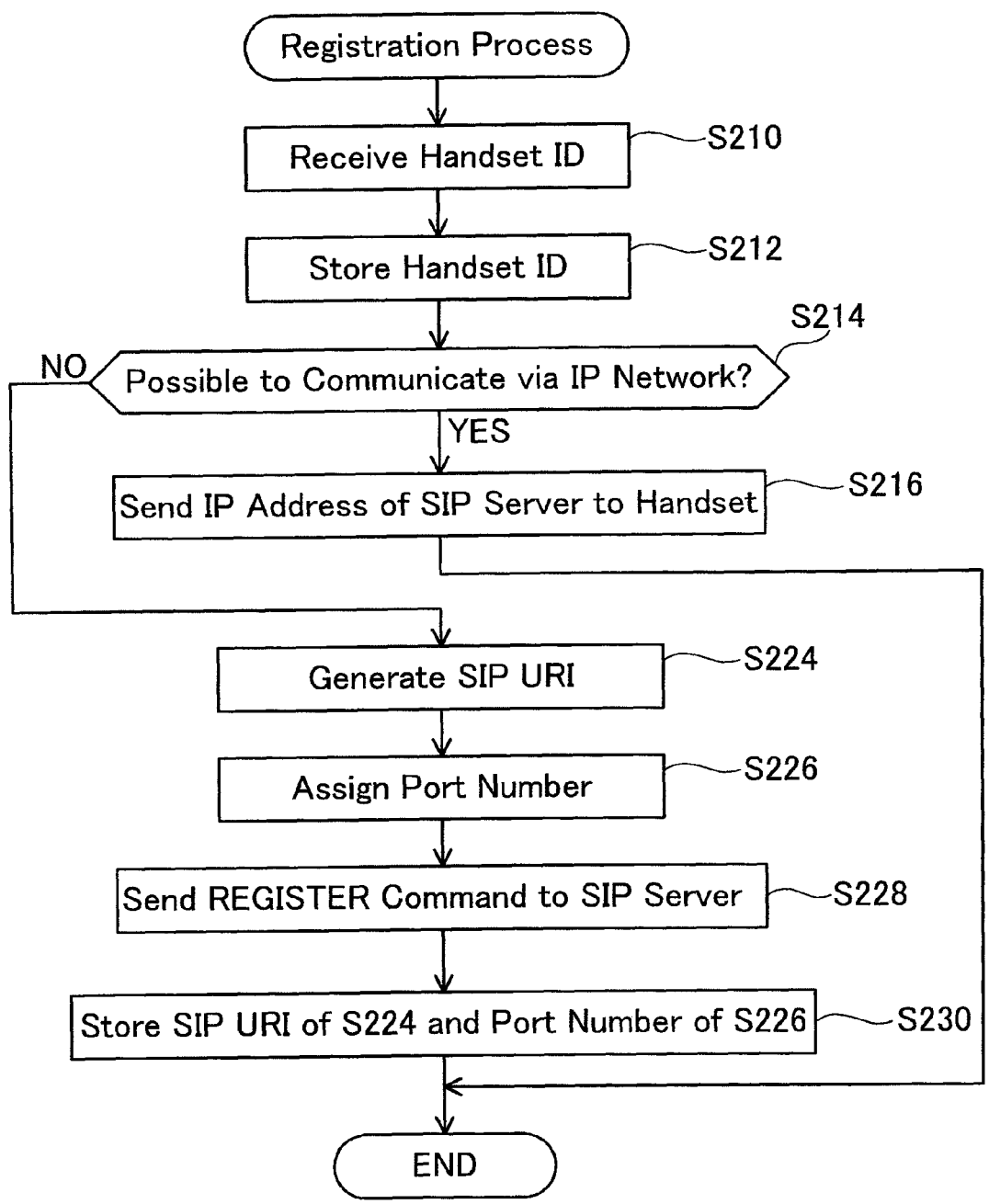
FIG. 12 shows a flowchart of the registration process of the second embodiment.

FIG. 12 shows a flowchart of the registration process of this embodiment. Since S210 through S216 are the same as the process of S10 through S16 of FIG. 5, a detailed explanation of this processing will be omitted. In a case where a determination of NO is made in S214, the process moves to S224. Furthermore, the further explanation below is given with the example in which the process of S224 and beyond is executed for the handset device 50. The process of S224 is the same as that of S22 of FIG. 5, and as such, a detailed explanation will be omitted. Next, the base-side controller 22 assigns a port number (S226). The base-side controller 22 executes the process of S226 by randomly selecting one port from among the unused ports. Next, the base-side controller 22 sends a REGISTER command to the SIP server 106 (S228). The above REGISTER command includes an association of the IP address 32*a* of the base device 20 (cf. FIG. 2) and the port number assigned in S226, and the SIP URI (SIP URI of handset device 50) generated in S224. The SIP server 106 associatively stores the association of the IP address 32*a* of the base device 20 and the port number determined in S226, and the SIP URI of the handset device 50.

Next, the base-side controller 22 stores the SIP URI of the handset device 50 and the port number assigned in S226 in the handset device information storage area 31 (S230). In this embodiment, "sssss" is stored as the port number of the handset device 50 (cf. FIG. 11). Furthermore, in a case where the process of S224 and beyond is executed for the handset device 70, port number "ttttt" is stored in the handset device information storage area 31 in S230 (cf. FIG. 11). The registration process ends in a case where S230 ends.

Furthermore, in a case where the base device 20 registers itself to the SIP server 106, the base device 20 sends an association of its own IP address 32*a* and a predetermined port number (a default port number), and its own SIP URI 32*b* to the SIP server 106. Upon receiving this information, the SIP server 106 associatively stores the association of the IP address 32*a* of the base device 20 and the above default port number, and the SIP URI 32*b* of the base device 20.

As described hereinabove, the SIP server 106 of this embodiment stores an association of the IP address 32*a* and the port number for each of the devices 20, 50, 70 configuring the extension network 10. For example, in a case where the IP telephone device 120 places a phone call to the handset device 50, the SIP server 106 sends an INVITE having the association of the IP address 32*a* of the base device 20 and the port number of the handset device 50 as the destination. The base-side controller 22 is able to specify the handset device ID "XXX" of the handset device 50 from among the information stored in the handset device information storage area 31 based on the INVITE-received port number. That is, by analyzing the INVITE, the base-side controller 22 is able to specify the handset device ID "XXX" of handset device 50 without specifying the SIP URI of the destination included in the INVITE. In this embodiment, it is possible to simplify the program because the process for analyzing the INVITE is not required when executing the process of S70 of FIG. 7 and S110 of FIG. 8. Further, by assigning the handset devices 50 and 70 to different ports, for example, it is possible to perform a telephone communication via the IP network using the other handset device even where a telephone communication is being performed via the IP network by the one handset device.

Examples of variations of the embodiments described hereinabove are given below.

Figure 8:
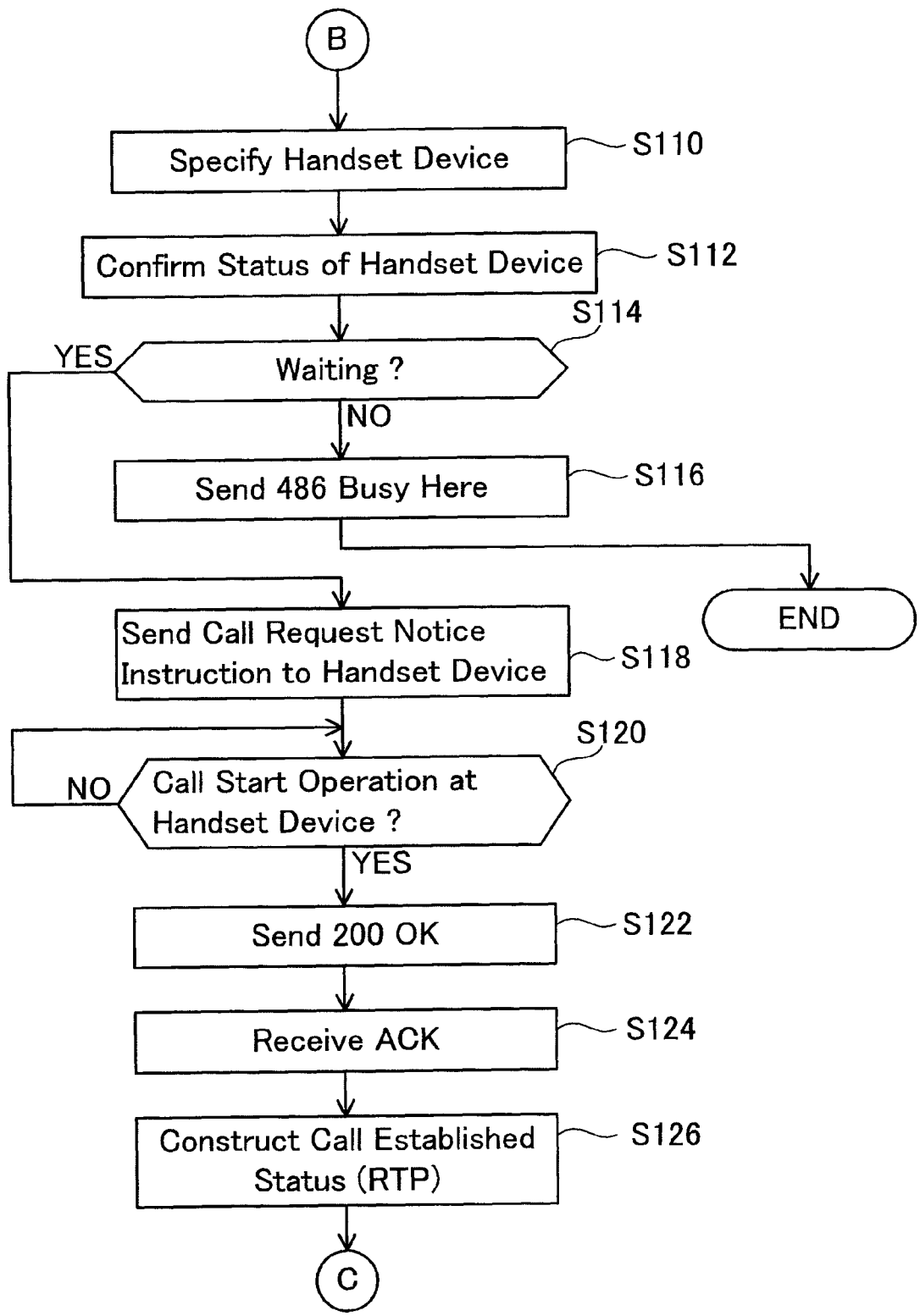
FIG. 8 shows the continuation of the flowchart of FIG. 7.

In the above embodiments, the base-side controller 22 confirms the status of the handset device in S112 of FIG. 8 by sending a status confirmation command to the handset device and receiving a response. However, the base device 20 may constantly monitor the status of the handset device. For example, in a case where an operation for placing a phone call is performed at the handset device, the base device 20 may store the busy status in association with this handset device. Conversely, in a case where a phone call is disconnected at this handset device, the base device 20 may store the waiting status in association with this handset device. Monitoring and storing the statuses of the respective handset devices 50, 70 makes it possible to specify the status of the handset device 50, 70 without sending the status conformation command in S112 of FIG. 8.

Further, in the above embodiments, the SIP URI of handset device 50 is generated in S22 of FIG. 5 by adding characters (for example, bbb.) in front of the base device 20 SIP URI "aaa@example.com". However, the base-side controller 22 may generate the SIP URI of the handset device 50 by adding characters to the middle portion of the plurality of characters configuring the SIP URI of the base device 20. For example, the base-side controller 22 may generate the SIP URI of the handset device 50 by adding characters between "aaa" and "@example.com". In this case, for example, a SIP URI like "aaa.bbb@example.com" will be generated.

Further, in the above embodiments, voice data communications between any of the base handset 40 and the respective handset devices 50, 70, 80, and the IP telephone device 120 are executed by way of the SIP server 106. However, the voice data communication may be executed without going through the SIP server 106 in a case where a communication session for calling has been established. For example, in a case where a RTP communication session for calling is established between the base handset 40 and the IP telephone device 120, Voice data inputted to the IP telephone device 120 is sent to the extension network 10 (base device 20) via the Internet 104. Further, the base-side controller 22 sends the voice data inputted to the microphone 44 to the telephone device 120 via the Internet 104. A call is thereby able to be performed between the base handset 40 and the IP telephone device 120.

An overview of a portion of the technical features described in the above embodiment will be given here.

The dual network telephone device may perform a telephone communication using the SIP (Session Initiation Protocol). Other protocols may also be used. For example, "H.323", "MGCP (Media Gateway Control Protocol)", "H.248/MEGACO (Media Gateway Control)" may be used.

In a case where the SIP is used, the call request may be an INVITE. Further, a 200 OK may be the positive response in reply to the call request, and a 486 Busy Here may be the negative response in reply to the call request.

The dual network telephone device may be configured to execute a call request notice at its own device, and send a call request notice instruction to a non-IP telephone device on a condition that the call request is received via the public telephone network. Conversely, the dual network telephone device may be configured to execute a call request notice at its own device on a condition that the call request is received via the IP network, and the destination of this call request is the dual network telephone device. In this case, the dual network telephone device may not send a call request notice instruction to the non-IP telephone device. Further, the dual network telephone device may send a call request notice instruction to the non-IP telephone device on a condition that the call request is received via the IP network, and the destination of this call request is the non-IP telephone device. In this case, the dual network telephone device may not execute a call request notice at its own device.

An IP telephone device comprising the following configurations (1) to (3) is also useful.

(1) An IP telephone identification information generating device configured to generate IP telephone identification information for a non-IP telephone device.

(2) A registering device configured to register to the IP telephone server an association of an IP address of the IP telephone device and the IP telephone identification information for the above-mentioned non-IP telephone device generated by the IP telephone identification information generating device.

(3) A voice data transferring device configured to transfer to the above-mentioned non-IP telephone device the voice data sent from the above-mentioned IP telephone server, and for transferring to the above-mentioned IP telephone server the voice data sent from the above-mentioned non-IP telephone device.

The IP telephone identification information for a large number of IP telephone devices is normally registered to the IP telephone server. Each piece of IP telephone identification information registered to the IP telephone server must be unique. Therefore, the IP telephone identification information generating device has to generate IP telephone identification information that is not registered to the IP telephone server. For this reason, the IP telephone identification information generating device may be configured to generate the IP telephone identification information for the non-IP telephone device such that the IP telephone identification information for the non-IP telephone device includes the IP telephone identification information for the dual network telephone device in a case where generating the IP telephone identification information for the non-IP telephone device. Because the IP telephone identification information of the dual network telephone device is unique, the IP telephone identification information that includes this IP telephone identification information may also be expected to be unique. According to this configuration, the IP telephone identification information generating device is possible to generate unique IP telephone identification information for the non-IP telephone device.

The IP telephone identification information generating device may be configured to generate IP telephone identification information for each of a plurality of non-IP telephone devices configured to perform the telephone communication using the dual network telephone device via the public telephone network. The registering device may be configured to register to the IP telephone server, for each of the plurality of non-IP telephone devices, an association of the IP address of the dual network telephone device and the IP telephone identification information for the non-IP telephone device. The dual network telephone device may further comprise a first storing device. The first storing device may be configured to store, for each of the plurality of non-IP telephone devices, an association of the IP telephone identification information for the non-IP telephone device and specifying information for specifying the non-IP telephone device.

The notice instruction sending device may be configured to identify within the first storing device the specifying information associated with the IP telephone identification information included in the call request received by the call request receiving device as the call request destination, and may be configured to send the call request notice instruction to the non-IP telephone device specified by the identified specifying information. According to this configuration, in a case where a call request that regards a non-IP telephone device specified from among the plurality of non-IP telephone devices as the destination has been received, it is possible to send a call request notice instruction only to this non-IP telephone device.

Further, the IP telephone identification information receiving device may be configured to receive the IP telephone identification information sent from the non-IP telephone device and the specifying information of the non-IP telephone device. In accordance with this, the second call request sent from the call request sending device may include both the IP telephone identification information received by the IP telephone identification information receiving device as the call request destination and the IP telephone identification information associated within the first storing device with the specifying information received by the IP telephone identification information receiving device as the call request source. According to this configuration, it is possible to place a telephone call via the IP telephone network from any of the plurality of non-IP telephone devices.

The IP telephone identification information generating device may be configured to generate IP telephone identification information for each of the plurality of non-IP telephone devices. The dual network telephone device may further comprise a port number assigning device. The port number assigning device may be configured to assign a different port number to each of a plurality of non-IP telephone devices. The registering device may be configured to register to the IP telephone server, for each of the non-IP telephone devices, an association of the IP address of the dual network telephone device, the port number assigned to the non-IP telephone device, and the IP telephone identification information for the non-IP telephone device. The dual network telephone device may further comprise a second storing device. The second storing device may be configured to store, for each of the plurality of non-IP telephone devices, an association of the IP telephone identification information for the non-IP telephone device, the port number assigned to the non-IP telephone device, and the specifying information of the non-IP telephone device.

The notice instruction sending device may be configured to identify within the second storing device the specifying information associated with the port number included in the first call request received by the call request receiving device, and may be configured to send the call request notice instruction to the non-IP telephone device specified by the identified specifying information. According to this configuration, in a case where a call request that regards the non-IP telephone device specified from among the plurality of non-IP telephone devices as the destination has been received, it is possible to send a call request notice instruction to only this non-IP telephone device.

Further, the IP telephone identification information receiving device may be configured to receive the IP telephone identification information and the specifying information of the non-IP telephone device sent from the non-IP telephone device. The second call request received by the call request receiving device may include both the IP telephone identification information received by the IP telephone identification information receiving device as the call request destination and the IP telephone identification information associated within the second storing device with the specifying information received by the IP telephone identification information receiving device as the call request source. According to this configuration, it is possible to place a telephone call via the IP telephone network from any of the plurality of non-IP telephone devices.

In order for the non-IP telephone device to perform a telephone communication via the public telephone network using the dual network telephone device, the setting information (for example, the device ID of the non-IP telephone device, and the setting information for a wireless communication) of the non-IP telephone device must be registered to the dual network telephone device. For this reason, the dual network telephone device may further comprise a setting information acquiring device. The setting information acquiring device may be configured to acquire from the non-IP telephone device setting information for the non-IP telephone device to perform a telephone communication via the public telephone network on a condition that a predetermined operation is performed at the dual network telephone device and/or the non-IP telephone device. In accordance with this, on the condition that the setting information of the non-IP telephone device is acquired by the setting information acquiring device, the IP telephone identification information generating device may be configured to generate the IP telephone identification information for the non-IP telephone device and the registering device may register to the IP telephone server the association of the IP address of the dual network telephone device and the IP telephone identification information for the non-IP telephone device. According to this configuration, if the user performs an operation (the above predetermined operation) for registering the setting information of the non-IP telephone device to the dual network telephone device, not only is it possible to register the setting information of the non-IP telephone device to the dual network telephone device, it is also possible to register this non-IP telephone device to the IP telephone server.

What is claimed is:

1. A dual network telephone device configured to selectively perform a telephone communication via a public telephone network and via an IP telephone network, the dual network telephone device comprising:
   an IP telephone identification information generating device configured to generate IP telephone identification information for a non-IP telephone device configured to perform a telephone communication using the dual network telephone device via the public telephone network;
   a registering device configured to register to an IP telephone server an association of an IP address of the dual network telephone device and the IP telephone identification information for the non-IP telephone device;
   a call request receiving device configured to receive a first call request sent from the IP telephone server or via the public telephone network;
   a notice instruction sending device configured to send a call request notice instruction to the non-IP telephone device and the dual network telephone device is configured to execute a call request notice on the dual network telephone device when the first call request is received via the public telephone network, and the notice instruction sending device is configured to send the call request notice instruction to the non-IP telephone device and the dual network telephone device does not execute a call request notice on the dual network telephone device when the first call request is received via the IP telephone network and the first call request includes the IP telephone identification information for the non-IP telephone device as a call request destination;
   an IP telephone identification information receiving device configured to receive IP telephone identification information input to and sent from the non-IP telephone device;
   a call request sending device configured to send a second call request to the IP telephone server, wherein the second call request includes both the IP telephone identification information received by the IP telephone identification information receiving device as a call request destination and the IP telephone identification information for the non-IP telephone device as a call request source;
   a response receiving device configured to receive a response in reply to the second call request; and
   a voice data transferring device configured to transfer voice data, which is sent from the call request source of the first call request or from the call request destination of the second call request, to the non-IP telephone device, and to transfer voice data sent from the non-IP telephone device to the call request source of the first call request or to the call request destination of the second call request on a condition that a call start operation is operated at the non-IP telephone device in response to the call request notice instruction sent by the notice instruction sending device or the response received by the response receiving device is a positive response.

2. The dual network telephone device as in claim 1, wherein
the IP telephone identification information generating device is configured to generate the IP telephone identification information for the non-IP telephone device such that the IP telephone identification information for the non-IP telephone device includes IP telephone identification information for the dual network telephone device.

3. The dual network telephone device as in claim 1, further comprising:
a first storing device,
wherein the IP telephone identification information generating device is configured to generate the IP telephone identification information for each of a plurality of non-IP telephone devices configured to perform the telephone communication using the dual network telephone device via the public telephone network,
the registering device is configured to register to the IP telephone server, for each of the non-IP telephone devices, an association of the IP address of the dual network telephone device and the IP telephone identification information for the non-IP telephone device,
the first storing device is configured to store, for each of the non-IP telephone devices, an association of the IP telephone identification information for the non-IP telephone device and specifying information of the non-IP telephone device,
wherein, when the first call request is received via the IP telephone network and the first call request includes the IP telephone identification information for the non-IP telephone device as the call request destination, the notice instruction sending device is configured to identify within the first storing device the specifying information associated with the IP telephone identification information included in the first call request as the call request destination, and to send the call request notice instruction to the non-IP telephone device specified by the identified specifying information,
wherein, when the first call request is received via the public telephone network, the notice instruction sending device is configured to send the call request notice instructions to each of the plurality of non-IP telephone devices,
the IP telephone identification information receiving device is configured to receive the IP telephone identification information sent from the non-IP telephone device and the specifying information of the non-IP telephone device, and
the second call request includes both the IP telephone identification information received by the IP telephone identification information receiving device as the call request destination and the IP telephone identification information associated within the first storing device with the specifying information received by the IP telephone identification information receiving device as the call request source.

4. The dual network telephone device as in claim 1, further comprising:
a port number assigning device configured to assign an unique port number to each of a plurality of non-IP telephone devices configured to perform the telephone communication using the dual network telephone device via the public telephone network; and
a second storing device,
wherein the IP telephone identification information generating device is configured to generate the IP telephone identification information for each of the non-IP telephone devices,
the registering device is configured to register to the IP telephone server, for each of the non-IP telephone devices, an association of the IP address of the dual network telephone device, the port number assigned to the non-IP telephone device and the IP telephone identification information for the non-IP telephone device,
the second storing device is configured to store, for each of the non-IP telephone devices, an association of the IP telephone identification information for the non-IP telephone device, the port number assigned to the non-IP telephone device and specifying information of the non-IP telephone device
wherein, when the first call request is received via the IP telephone network and the first call request includes the IP telephone identification information for the non-IP telephone device as the call request destination, the notice instruction sending device is configured to identify within the second storing device the specifying information associated with the port number included in the first call request and to send the call request notice instruction to the non-IP telephone device specified by the identified specifying information,
wherein, when the first call request is received via the public telephone network, the notice instruction sending device is configured to send the call request notice instructions to each of the plurality of non-IP telephone devices,
the IP telephone identification information receiving device is configured to receive the IP telephone identification information and the specifying information of the non-IP telephone device, and
the second call request includes both the IP telephone identification information received by the IP telephone identification information receiving device as the call request destination and the IP telephone identification information associated within the second storing device with the specifying information received by the IP telephone identification information receiving device as the call request source.

5. The dual network telephone device as in claim 1, further comprising:
a setting information acquiring device configured to acquire setting information from the non-IP telephone device, on a condition that a predetermined operation is operated at the dual network telephone device and/or the non-IP telephone device, wherein the setting information is information of the non-IP telephone device for performing the telephone communication via the public telephone network,
wherein on a condition that the setting information of the non-IP telephone device is acquired by the setting information acquiring device, the IP telephone identification information generating device is configured to generate the IP telephone identification information for the non-IP telephone device and the registering device is configured to register to the IP telephone server the association of the IP address of the dual network telephone device and the IP telephone identification information for the non-IP telephone device.

* * * * *